US006474671B1

(12) United States Patent
San Miguel Gomez et al.

(10) Patent No.: US 6,474,671 B1
(45) Date of Patent: Nov. 5, 2002

(54) DEVICE FOR PLAYING WHEELCHAIR FOOTBALL

(76) Inventors: Jose Raul San Miguel Gomez, Paseo General Davila, 70, 39006 Santander (ES); Manuel San Miguel Gomez, Calle Industria, 14, 39610 Astillero (ES)

( * ) Notice: Subject to any disclaimer, the term of this patent is extended or adjusted under 35 U.S.C. 154(b) by 0 days.

(21) Appl. No.: 09/744,430

(22) PCT Filed: Feb. 11, 2000

(86) PCT No.: PCT/ES00/00047

§ 371 (c)(1), (2), (4) Date: Jan. 24, 2001

(87) PCT Pub. No.: WO00/71069

PCT Pub. Date: Nov. 30, 2000

(30) Foreign Application Priority Data

May 24, 1999 (ES) .............................................. 9901111

(51) Int. Cl.$^{7}$ .................................................. B62H 9/00
(52) U.S. Cl. .................................... 280/304.1; 473/471
(58) Field of Search .......................... 280/304.1, 250.1, 280/288.4, 291; 473/471; 180/907

(56) References Cited

U.S. PATENT DOCUMENTS 4,470,598 A * 9/1984 Steele et al. ............. 280/304.1
4,506,901 A * 3/1985 Tosti ....................... 280/250.1
4,592,570 A * 6/1986 Nassiri ..................... 280/250.1
4,643,446 A * 2/1987 Murphy ................... 280/250.1
4,753,449 A * 6/1988 Doucet ..................... 280/304.1
5,363,934 A * 11/1994 Edmund et al. ......... 280/304.1
5,672,116 A * 9/1997 Bryan et al. ............. 280/250.1
5,727,809 A * 3/1998 Ordelman et al. ....... 280/250.1
6,004,233 A * 12/1999 Raubuck et al. ......... 280/304.1

FOREIGN PATENT DOCUMENTS

EP 268960 * 6/1988 .............. 280/304.1

* cited by examiner

*Primary Examiner*—Daniel G. DePumpo
(74) *Attorney, Agent, or Firm*—Reed Smith LLP

(57) ABSTRACT

The present invention provides for a support guide consisting of a frame with two side bars (1–1') of suitable dimensions which are attached, by bolts for example, to the sides of the front of a wheelchair, and between which there is a transversal rod (3) which forms the support guide in itself and is affixed to the bottom ends of the side bars (1–1'). The transversal rod has two lateral projections pointing backwards and closing over each other in the form of a transversal extension forming a raided loop or semi-ring (11) that is located along an imaginary plane angled forward and downward in such a way that the loop (11), located centrally, is suitable in terms of its dimensions and position to act laterally on a ball pushing it over a field of play when a wheelchair is moved. This therefore forms a type of housing for a ball at the front of a wheelchair as it makes it possible to receive and drive the ball over a field of play.

12 Claims, 2 Drawing Sheets

DEVICE FOR PLAYING WHEELCHAIR FOOTBALL

BACKGROUND OF THE INVENTION

The present invention relates to a support guide that may be fitted to the front of a wheelchair and which is especially designed for the practice of the sport of football by disabled people in wheelchairs.

The support guide is usable by people with physical disabilities involving the complete or partial immobility of their legs who have to use a wheelchair to move around. The support guide makes it possible for them to play football as it is used as a means of retaining and moving the ball.

As is well known, the practice by the disabled of several sports is becoming more widespread, and in sports in which the use of a wheelchair has already attained a very high level such as basketball, the players' hands are the essential elements used in play.

This is not the case for football which requires the use of feet to be played due to the specific nature of the disability of the players in question.

In an attempt to increase the playing of football by the disabled, Applicant is the holder of Spanish Patent of Invention under Application No. P 9802702, which consists of an apparatus for the practice of football in a wheelchair. The apparatus takes the form of a body that reproduces, with a certain degree of faithfulness, the configuration and dimensions of a human foot, up to the top of the same, from the center of the top of which a short arm emerges that is finished in a holder noticeably parallel to the longitudinal axis of the body, in such a way that a disabled individual in a wheelchair is able to use the apparatus with either hand, to receive, control and drive the ball.

In Application No. P 9802702, it was foreseen that under certain circumstances, most especially when advancing on a field, a player would push a ball along using the front of a wheelchair. Nevertheless, the structural characteristics of conventional wheelchairs are not at all ideal for doing this.

SUMMARY OF THE INVENTION

The support guide of the present invention has been especially designed to resolve the problem explained in the previous paragraph in such a way that when it is duly attached to the front of a conventional wheelchair, by means of bolts for example, it offers optimum performance in terms of ball control as it directs a ball over a field by means of moving the chair itself forward.

To this end and more specifically, the support guide of the present invention is composed of a frame of a hard, light and strong material, including two side bars which are precisely the parts of the same that have the purpose of fitting and attaching to the sides of the front of a wheelchair, while between the side bars, which in practice are set at the same angle as the front of the wheelchair, specifically at a lower level, there is a transverse rod which is the guide itself, and which has a special configuration that allows it to fulfill the function for which it is provided in a satisfactory manner.

Specifically, this rod has two side projections which point backwards and which at their rearmost end have orthogonal elbows angled inwards and closing one over the other by means of a central semi-ring which is open at the bottom and located along an imaginary plane that is angled forward and downward in such a way that the semi-ring is suitable in form and position to partially adapt to a ball and move it over a field of play when the wheelchair is moved.

According to another characteristic of the invention, this bar is fitted with a rubber tube cover and is threaded to ensure good fixing of the cover.

It only remains to be said that the supports included in the invention of Application No. P 9802702 for holding the apparatus to which that patent application refers will now be located on the side bars of the support guide, configuring a single unit together with the latter.

BRIEF DESCRIPTION OF THE DRAWINGS

As a complementary item to below description and with the aim of aiding towards greater comprehension of the characteristics of the invention, according to a preferential form of execution of the same, the below description is accompanied by a set of drawings that form an integral part of the same, and which as illustrations and not as restrictions, the following are shown.

DETAILED DESCRIPTION OF THE INVENTION

Figure 1:
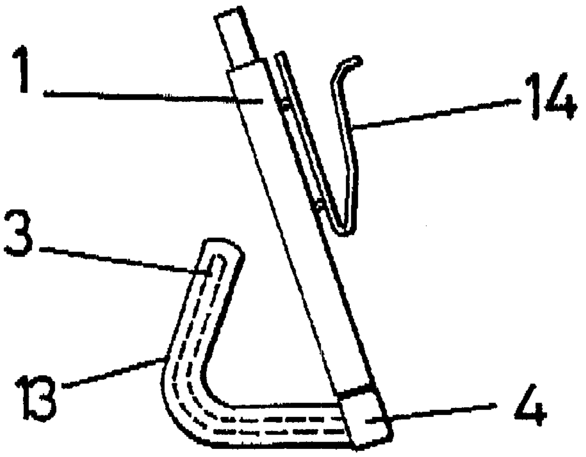
FIG. 1 shows a side view of a support guide for the practice of football in a wheelchair according to the present invention.
Figure 2:
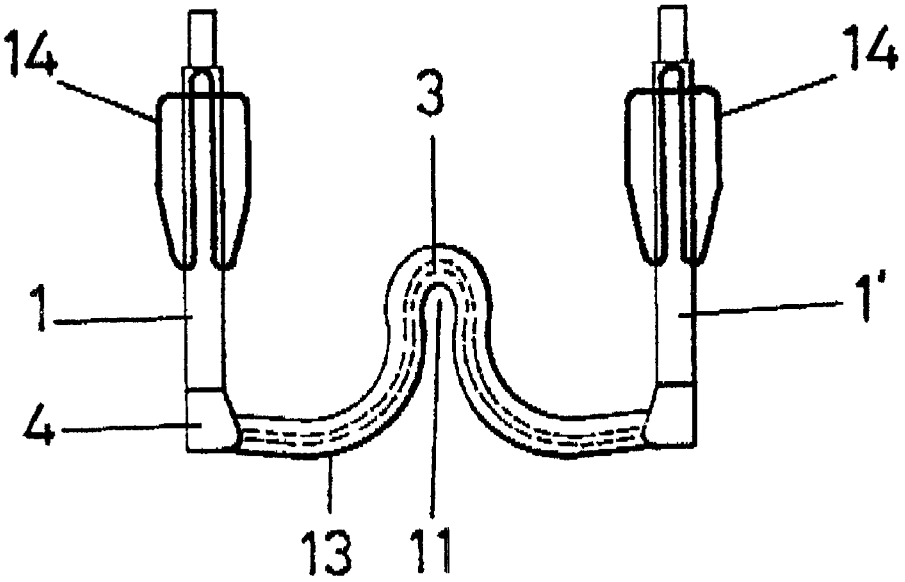
FIG. 2 shows a front view of the same support guide.
Figure 3:
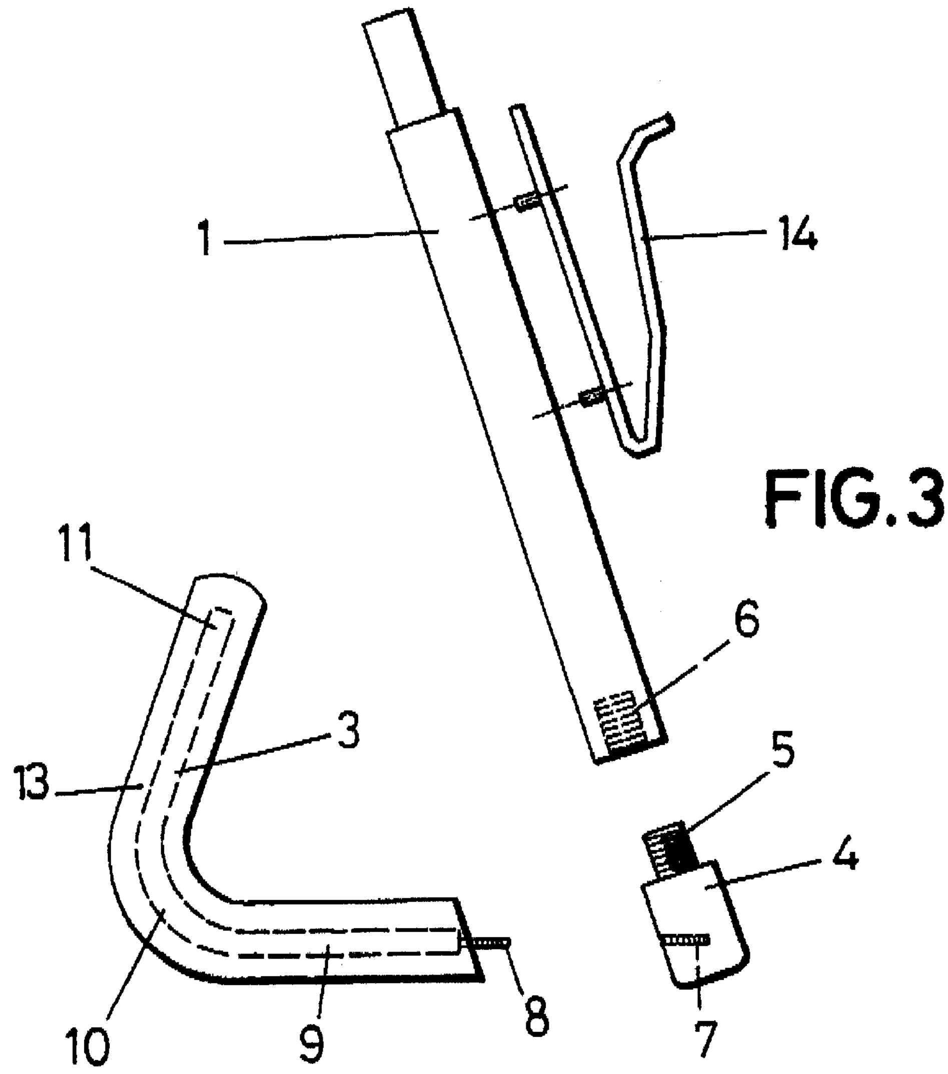
FIG. 3 shows a breakdown of the guide in profile.

In light of the figures, it may be observed that the support guide as specified is composed of a frame which in turn comprises two side bars (1) and (1') which are noticeably parallel and which are used to fit onto the sides of the front of the wheelchair (2). As is shown in FIG. 4, between the bars (1)–(1') at the bottom of the support guide, there is a transversal bar (3), preferably with a set of both joints (4) equipped with a threaded neck (5) for fitting through a threaded orifice (6) to their respective bars (1), and a threaded orifice (7) through which corresponding ends (8) of the bar (3) enter, although there is an obvious possibility that the bars (1) and the rod (3) may be joined by any other means such as by welding or that they may even form a single part.

Figure 4:
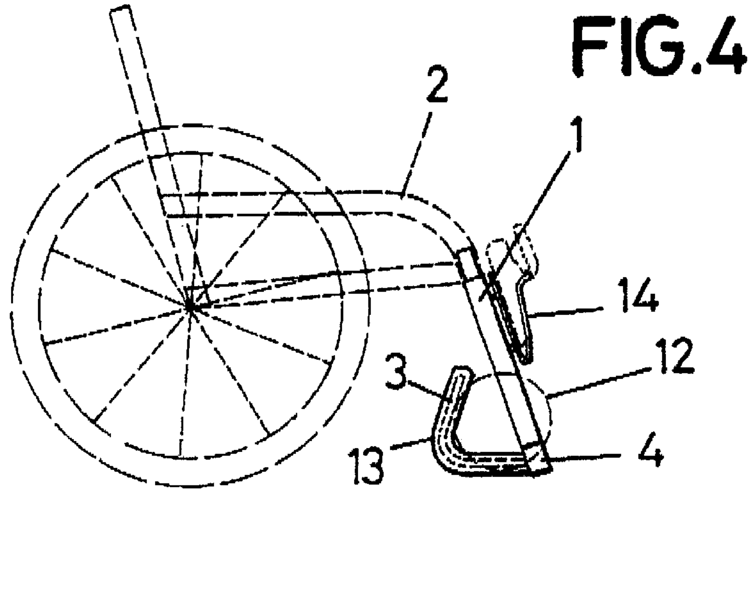
FIG. 4 shows, finally and also in the form of a side view, the support guide shown in the previous figures duly affixed to a wheelchair, and also in this figure, all of those elements which do not form parts of the invention are shown with broken lines.

In any case, the rod (3), which is symmetrical in configuration, has two lateral protuberances (9) which point backwards and have a rounded elbow (10) so that they may be joined together corresponding with the half projection of the rod, forming a type of loop or semi-ring (11) angled upward and forward, which forms a front that also faces forward and downward, in which the semi-ring (11) is located at a suitable height to act on the ball (12) when the latter moves over the field of play, as shown in FIG. 4.

As was mentioned above, the rod (3) is fitted with a covering (13) of rubber or another soft material to improve the conditions under which the ball (12) makes impact against the same, and that the rod (3) will be threaded to improve the grip of the covering (13) on the same.

According to this structure, and following the fitting of the support guide onto the wheelchair (2), the front of the latter will have a place for the ball (12) at the center and bottom of the same, facilitating the capture of the ball (12) and also moving it over the field of play by pushing it with the wheelchair (2) by means of the guide.

The structure described is complemented with a pair of supports (14), as shown in Spanish Patent Application No. P 9802702, to temporarily affix the apparatus for manual control and driving of the ball as described in the Spanish patent application, which are now affixed by bolts or any other means to the top part of the side bars (1).

What is claimed is:

1. A support guide which is affixed to a wheelchair (2) at its front to enable a disabled person to play wheelchair football, the support guide comprising:

a frame having two side bars (1,1'); and a transversal rod (3) between the side bars (1,1') wherein the transversal rod (3) comprises two lateral projections (9) pointing backward and having rounded elbows (10) pointing inward at their rearmost end such that the lateral projections (9) are joined to form a transversal projection having a shape of a semi-ring (11) that is substantially raised and included in an imaginary plane angled downward and forward, and the semi-ring (11) is duly positioned and angled to move a ball (12) over a field of play using movement of the wheelchair (2);

wherein the support guide has a shape suitable for affixing it to both sides of the front of the wheelchair (2) and a disabled person can move the ball (12) over the field of play by pushing the ball (12) with the support guide.

2. The support guide of claim 1, wherein the transversal rod (3) comprises a covering (13) comprising a soft material that improves conditions of contact with the ball (12).

3. The support guide of claim 2, wherein the soft material is rubber.

4. The support guide of claim 2, wherein the transversal rod (3) is threaded to ensure better adhesion to the covering (13).

5. The support guide of claim 2, further comprising supports (14) affixed to an upper frontal part of each of the sidebars (1,1').

6. The support guide of claim 2, wherein the support guide is permanently affixed to the wheelchair by welding.

7. The support guide of claim 2, wherein the side bars (1,1') are connected to the transversal rod (3) with a pair of joints (4).

8. The support guide of claim 7, wherein each of the side bars (1,1') comprises an orifice (6) and each joint (4) comprises a threaded neck (5) and the side bars (1,1') are connected to the transversal rod (3) by fitting the threaded neck (5) of one joint (4) into the orifice (6) of one of the side bars (1,1') and fitting the threaded neck (5) of the other joint (4) into the orifice (6) of the other side bar (1,1').

9. The support guide of claim 1, further comprising supports (14) affixed to an upper frontal part of each of the sidebars (1,1').

10. The support guide of claim 1, wherein the support guide is permanently affixed to the wheelchair by welding.

11. The support guide of claim 1, wherein the side bars (1,1') are connected to the transversal rod (3) with a pair of joints (4).

12. The support guide of claim 11, wherein each of the side bars (1,1') comprises an orifice (6) and each joint (4) comprises a threaded neck (5) and the side bars (1,1') are connected to the transversal rod (3) by fitting the threaded neck (5) of one joint (4) into the orifice (6) of one of the side bars (1,1') and fitting the threaded neck (5) of the other joint (4) into the orifice (6) of the other side bar (1,1').

* * * * *